United States Patent [19]
Casper

[11] 3,735,126
[45] May 22, 1973

[54] METHOD AND APPARATUS FOR TESTING ROCK COAL DUST

[75] Inventor: Karl J. Casper, Cleveland Heights, Ohio

[73] Assignee: Reuter-Stokes Electronic Components, Inc., Warrensville Heights, Ohio

[22] Filed: Jan. 8, 1971

[21] Appl. No.: 104,937

[52] U.S. Cl. ......250/43.5 D, 250/83 SA, 250/83.3 D, 250/106 S
[51] Int. Cl. ............................................G01n 23/10
[58] Field of Search .....................250/43.5 D, 83 SA, 250/106 S, 83.3 D

[56] References Cited

UNITED STATES PATENTS

| | | | |
|---|---|---|---|
| 3,448,264 | 6/1969 | Rhodes | 250/106 S X |
| 3,505,520 | 4/1970 | Stewart et al. | 250/43.5 D |
| 3,270,204 | 8/1966 | Rhodes | 250/43.5 D X |
| 3,399,303 | 8/1968 | Berk | 250/106 S X |

Primary Examiner—Archie R. Borchelt
Attorney—Fay, Sharpe & Mulholland

[57] ABSTRACT

A method and apparatus for determining the percentage incombustibles in a rock coal dust mixture by irradiating a sample of rock coal dust with gamma radiation from a collimated source spaced from the sample and measuring the backscattered radiation at an area behind the source. The sample of rock coal dust has a depth of about 2 inches to the entering gamma rays in order to minimize any changes in the count rate due to sample depth and density. Time is measured for detection of a predetermined number of radiation counts as a measurement of the percentage of incombustibles.

The apparatus includes a source of radiation collimated by a lead holder to irradiate a sample of the mixture of rock coal dust. The lead holder is centered on a detector's area of sensitivity to give significant count rates with relatively small sources of radiation.

16 Claims, 6 Drawing Figures

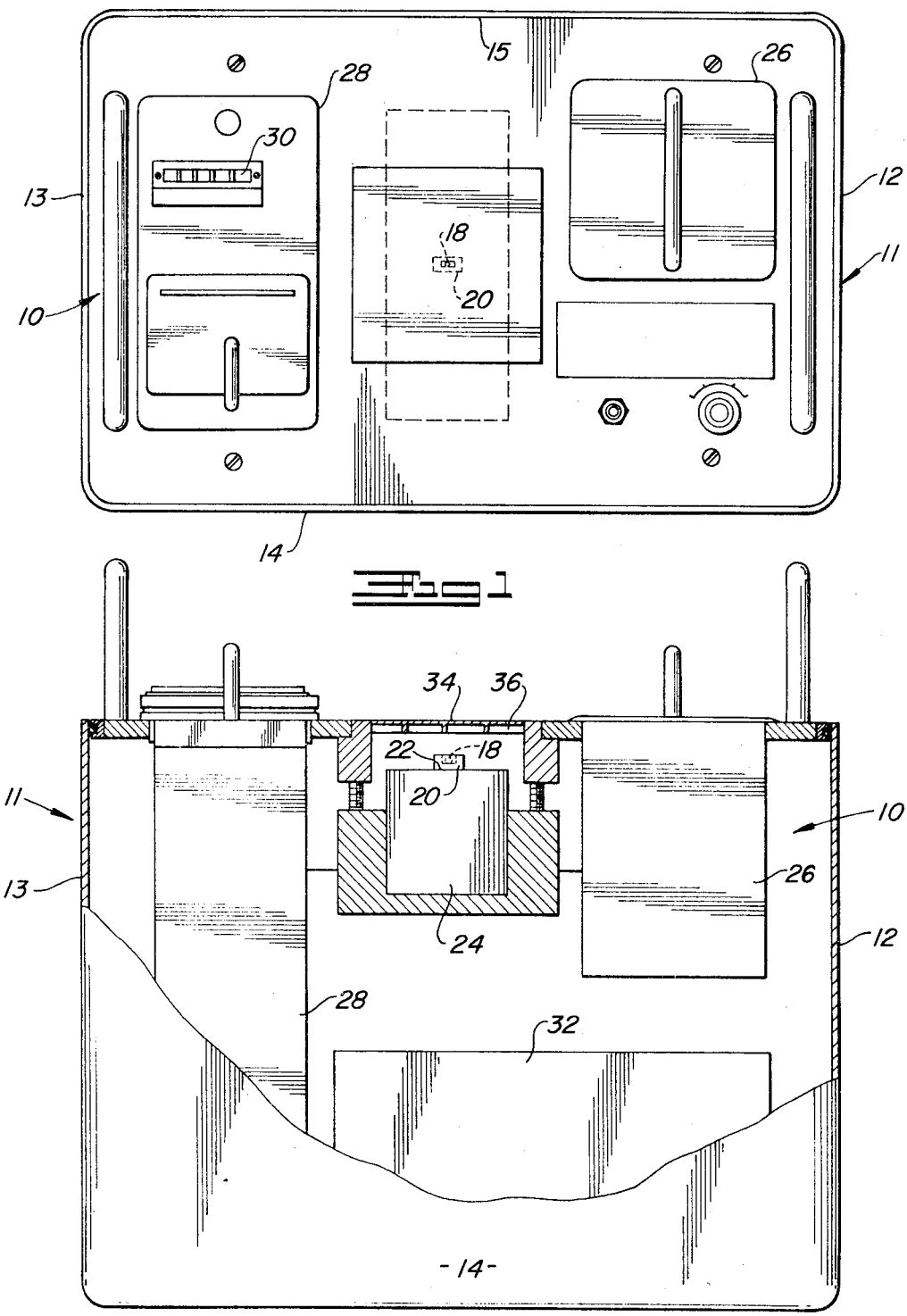

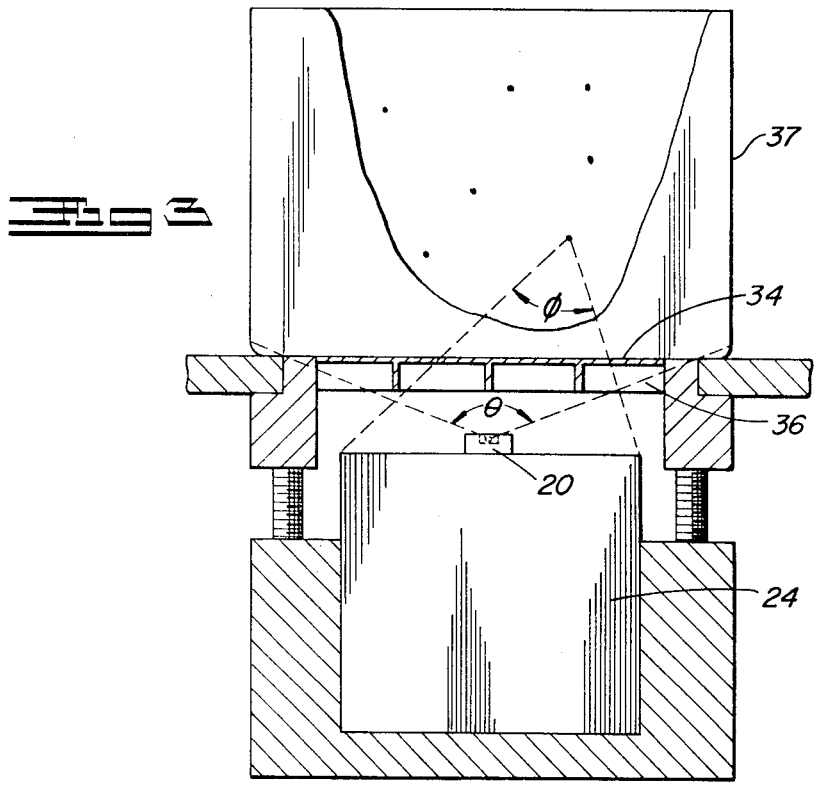
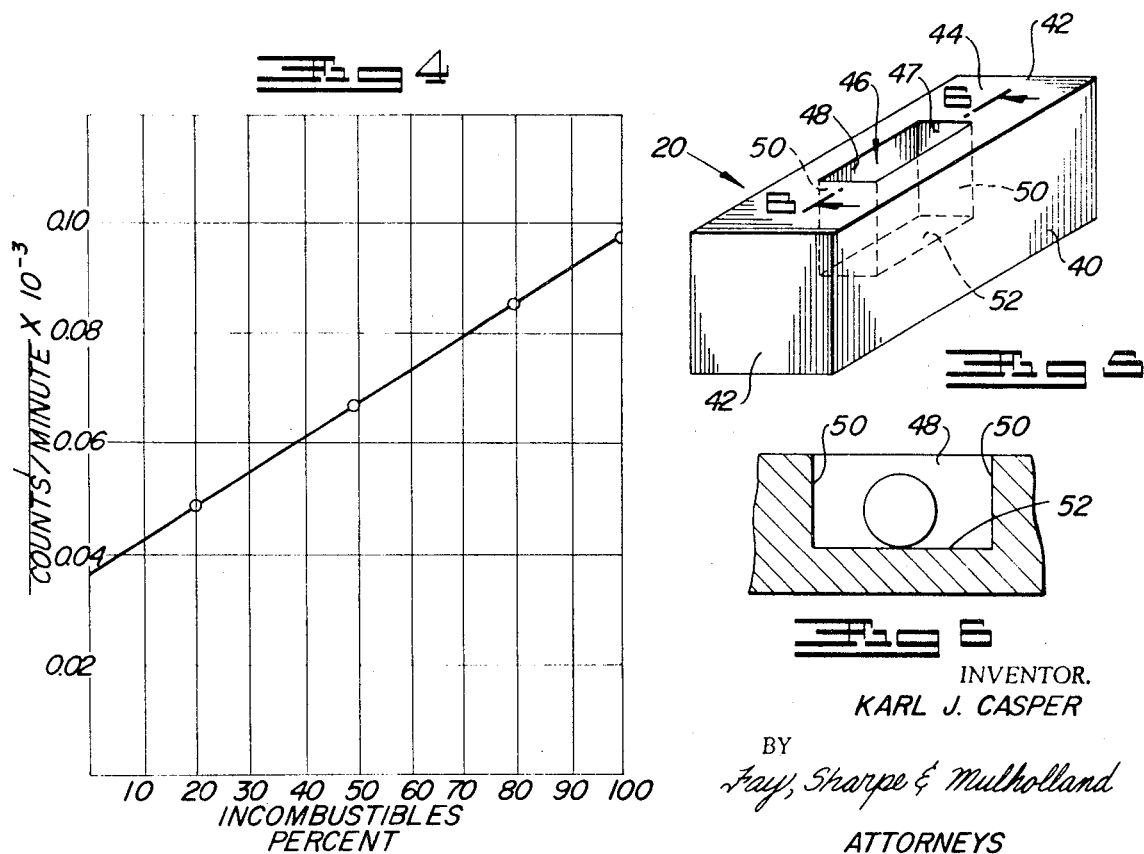

METHOD AND APPARATUS FOR TESTING ROCK COAL DUST

BACKGROUND OF THE INVENTION

This invention is an improvement of the Stewart et al device illustrated in U.S. Pat. No. 3,505,520, the disclosure of which is incorporated herein by reference as well as the references and other patents cited therein.

Coal dust fires and explosions are among the most serious hazards in coal mining. Shock waves which precede the actual combustion stir up dust on the floor and walls and increase the danger. If the dust in a mine has a high combustible content, i.e., coal dust, the explosion will not be confined to a small area but will spread rapidly. General safety practice required spreading rock dust to bring the incombustible content of the dust on the floor and walls to the legal minimum of 65 percent. Unfortunately, rapid determination of the incombustible content had been impossible since chemical analysis required several days and determined only a condition existing in the mine at the time the sample was taken. Thus, the delay in analysis was an impediment to legal enforcement and did not offer an adequate solution to the most important problem — the safety of the mine.

The Stewart et al patent mentioned above offered a partial solution to the time delay problem. It found that the backscatter radiation from gamma rays to a sample of the rock coal dust mixture indicated a determination of the percentage of incombustibles. However, the Stewart et al method and apparatus were not entirely satisfactory. The Stewart apparatus was bulky and the relationship of backscatter radiation to percentage incombustibles was relatively complex for a simple mechanism. It is the intent of this invention to provide a portable unit operable in the mine which gives an immediate reading of the incombustible content of the mine dust. In this manner it is a direct contribution to reducing the fire hazard.

The method and apparatus utilized in this invention relies upon the basic principle established experimentally by Stewart et al, that is, a number of gamma rays backscattered from a sample of mine dust is proportional to the percentage of combustible content. Utilizing this basic concept, this invention has significantly improved the relative geometry of the components of the equipment in order to provide improved accuracy and reduction in the number of components.

In particular, it was found in this invention that if the source of radiation were centered over the detector and between the detector and the sample, more accurate readings could be obtained because of the increase in the solid angle of radiation impingement. This arrangement with the use of a collimated radiation source provides a significant increase in the amount of backscatter radiation and thus permits the use of smaller radiation sources and less insulation.

The method of determining percentage incombustibles in this invention has also provided a significant advantage over the prior art. Previously, the count rate of the backscatter radiation was used as a direct determination of the percentage incombustibles. This relationship however was relatively complex and did not lend itself to translation without problems. In this invention it was discovered that the reciprocal of the count rate formed a linear relationship with the percentage incombustibles. Thus, all computations and/or equipment were vastly simplified to translate the backscatter radiation information into a reading of percentage of incombustibles. It was also found that the reciprocal of the count rate (counts/seconds) could be measured directly noting the time for a given number of counts (seconds/counts).

The advantages of this method and apparatus are obvious. They provide a useful sampling procedure which gives an immediate determination of the percentage of incombustibles of rock coal dust. The tests utilizing this method and apparatus can be conducted in the mine with a portable instrument and thereby give additional mine safety. The ease and speed of sampling using this method and apparatus can vastly increase the frequency of inspection and thereby the safety of each mine. The statistical error is also held fixed and can be preselected.

An additional advantage of the present method and apparatus will allow mine owners and managers who presently have no means of policing their own mines to make their own tests. This would provide them with the means to control the rock coal dust content within a conforming range and increase the safety of the mine.

SUMMARY OF THE INVENTION

An apparatus for quantitatively determining the composition of a mixture which includes a radiation detector having an area of sensitivity facing but spaced from a means for holding a sample of the mixture. A source of radiation is located between the area of sensitivity and the sample and is directed to emit radiation in the direction of the sample so the detector senses only backscatter radiation. A means for counting the backscatter radiation is operatively connected to the radiation detector.

The method for determining the percentage of combustibles in rock coal dust includes radiating the sample with radiation from the source, detecting the radiation reflected by the sample and measuring the reciprocal of the count rate of the deflected radiation as a determination of the percentage incombustibles.

PREFERRED EMBODIMENT

FIG. 1 is a top plan view of the instruments of this invention.

FIG. 2 is a side plan view partially cut away illustrating the instrument of this invention.

FIG. 3 is a side cross-sectional view of this invention with the sample shown in place.

FIG. 4 is a graph of counts per minute radiation versus incombustibles in rock coal dust.

FIG. 5 is a perspective view of the collimator for the source of radiation.

FIG. 6 is a cross-sectional view of the collimator taken along lines 6—6 of FIG. 5.

As illustrated in FIGS. 1 and 2, the apparatus of this invention is a portable instrument for use in determining the percentage of incombustibles in rock coal dust and is illustrated generally as 10. It is enclosed in a casing 11 having sides 12 and 13, front 14 and back 15.

A. Instrument Configuration

A source of radiation 18 is held in a collimated lead block 20 which may be surrounded by an aluminum holder with a stainless steel liner. A convenient size of the block is 0.375 inches long by 0.25 inches wide by 0.25 inches high although others may be used. The assembly of the source and holder is held by epoxy or other means on a brace in the middle of the counter window 22. The counter window is an area of sensitivity for a detector 24 which sits immediately below and supports the lead block 20. The lead block serves to shield the counter from the direct radiation of the source 18. Power for the detector 24 is supplied by a battery pack 26 mounted closely thereto.

A means 28 for measuring the count rate or reciprocal thereof includes a digital read-out 30 which may include a printer and a small computer-like device 32. This means for measuring the count rate or the reciprocal thereof illustrated in general terms of this invention are not disclosed since the details thereof do not form a part of the invention claimed in this application.

Platform 34 forms a means for holding a sample of the mixture which is to be tested. The platform 34 generally has a lead shield 36 so that the source of radiation 18 is not exposed until such time as desired. This shield 36 is naturally removed when the apparatus is in use.

An expanded view of the radiation source, detector and sampler are illustrated in FIG. 3. As noted therein and in FIG. 2, the detector 24 which is known in the art and is the type sold by Reuter Stokes of Cleveland, Ohio catalogue No. SK–560, is supported by screw threads which are connected to the support 34 of the instrument. In this way the distance between the detector and the sample can be adjusted.

The sample of the rock coal dust under test is held in a container 37. In order to achieve the desired accuracy of the instrument calibrated, sample cans are used. They are aluminum cans with thin bottom plates about 0.005 inch thick which are free of dents and bubbles although other embodiments can be used. A marked section of the plate 34 can be used to insure correct relative positions of the components. The plate 34 of the unit should be free of dust and the can must make intimate contact with the top of the unit.

The spacing between the sample and the source which is important for the accuracy of the instrument and must be at least initially calibrated. In the preferred embodiment, the spacing between the sample and the source should be about 6 mm and the spacing between the sample and the detector should be about 14 mm.

B. Radioactive Source

The radioactive source used in these measurements is the type stated in the Stewart et al patent noted above and in particular AM 241 which has a half life of 458 years. Previously, a source strength of 22 millicuries was required to achieve a counting rate of 500 counts per second. While a source of this size was not a significant problem in a laboratory situation, it was unsuitable for a portable unit being operated in the field by personnel relatively inexperienced in handling radioactive sources. One of the significant advantages of this invention is that it enables a considerable reduction in the source size. This is due in part to utilizing a closer arrangement of source and detector and by placing the source in the center of the area of sensitivity or counter face of the detector. By providing a close arrangement of source and detector an increase in the counting rate was achieved because of the increase of the solid angles (shown in FIG. 3 as $\theta$) between the source and sample and by the increase of the solid angles between the scattering centers of the sample and the detector (shown in FIG. 3 as $\phi$). The counting of radiation is proportional to the product of these two solid angles.

The use of a source of radiation in the center of the area of sensitivity of the detector as illustrated in FIG. 1, also increases the solid angle as noted above. In addition, this configuration utilizes a special nature of the Compton scattering effect. It has been found that the cross-section for Compton scattering is at a maximum when the scattering angle is 180°, that is, when the reflected path is the same as the incident path. At angles near 180° the effective cross-section is also large and produces significantly increased backscattering counts. In contrast to this, previous configurations and particularly that shown in the Stewart et al patent, scattering occurred at angles approximately 90° where the cross-section of the electron is considerably smaller and possibly a minimum. It is possible in this invention to have the source off center of the detection area as long as it is between the sample and the detector. It is important to permit about 180° deflection from the source of the detector.

A second advantage of having a large solid angle between the source and detector is that the energy spectrum of the scattered gamma rays have a very sharp peak in the backward direction. This spectrum is of a type which can be easily spanned by a discriminator window. That is small drifts in the discriminator setting have little effect on the overall counting rate. If the scattered spectrum is sharply peaked, then the discriminator window can have a relatively wide setting and small drifts can be tolerated. This advantage leads to long term stability in the instrument which naturally is highly advantageous.

The importance of the source configuration as detailed above was manifested in experimental results. Counting rates of three counts per second per microcurie of source were obscured. Thus, a counting rate of 500 counts per second was obtained with a source strength of 170 microcuries instead of the 22 millicuries required by the Stewart et al device. This is a factor two orders of magnitude smaller than the source used by Stewart et al.

It is probable that some of the increase in the results is from using the AM 241 source in conjunction with a lead holder 20 as illustrated in FIG. 5. The radioactive source AM 241 emits two gamma rays with energies of 26.3 keV and 59.6 keV. In addition, Neptunium K x-rays are also to be observed at 13.95 keV and 17.74 keV. In short, the close proximity of the lead holder to the source apparently results in a magnification of the source intensity through the production of lead x-rays with no increase in the actual source strength. This is a third effect contributing to the reduction of the source size through an increase in the backscattered count rate.

As illustrated in FIGS. 5 and 6, the lead block holder 20 has a front 40, sides 42, top 44 and a back and bottom not visible in FIG. 5. A recess 46 in the top 44 of the lead block holder is generally rectangular in shape and has a front 47, back 48, sides 50 and a bottom 52.

The lead block 20 holding the source performs two important functions. First, it is designed to reduce the amount of direct radiation, as opposed to scattered radiation, seen by the counter by interposing lead shielding between the source and the counter. The lead shielding must be sufficiently thick that no significant error is introduced and, generally, the direct radiation is attenuated to less than 1 percent. Second, for sources commonly available and for a standard sample configuration as described herein, the amount of collimation must be adjusted to yield a bulk density minimum. The source 18 is usually placed in a hole about 0.100 inches below the top of the lead block. The cross-section of the hole is determined by the size of the source.

C. Sample

Another important consideration in the method and apparatus of this invention is the size of the sample which is irradiated. In particular, the thickness, that is, the depth of the sample, facing the source of radiation has been found to be important. If a very thin sample is used, the gamma rays have a tendency to pass through the sample without significant backscattering. It was generally found that the intensity of the backscattered gamma rays increase with thickness up to a certain depth. Beyond this point called the infinite half-thickness the intensity remains nearly constant. That is, the amount of backscattering appears to reach a constant level.

Briefly, there are two effects which determine the thickness of the sample which is to be placed in the sample holder 36. As the thickness of the sample increases, there is a tendency to increase the intensity of the backscattered gamma rays by an amount which varies slowly with source sample separation distance. The Compton scattering cross-section favors direct backscattering at 180° and the intensity variation depends on the reduction in solid angle at scattering angles which are less favored.

The second effect, however, tends to reduce the intensity of the backscattered gamma rays as the thickness increases. The additional material is separated from the source by the other lower coal dust which will absorb and scatter the gamma rays. Thus, gamma rays, in order to be scattered by the additional layer, must pass through the intervening dust twice, once from the source to the upper parts of the sample and again from the sample to the counter. At some point the attenuation of this intervening layer will cancel any increase in intensity that would have been realized from the additional layer of material. This point of thickness is defined as the infinite half-thickness.

It has been found that in the use of rock coal dust in this invention that an actual value of the infinite half-thickness is approximately 2 inches. By experiments with different densities and percentage of incombustibles, it was found that 2 inch thickness for the sample was successful. Samples thicker than this infinite half-thickness produced an error that was not significant. However, samples less than this thickness could not produce the desired amount of backscatter necessary to make an accurate determination of the percentage incombustibles. Slightly smaller thicknesses, however, can be utilized without dramatically causing error. Thicknesses less than 1 inch, however, should be avoided since they appear to significantly reduce the number of counts. It should be understood, however, that by using different distances and source arrangements that different thicknesses could be used which would produce the desired results. One method of giving a uniform sample is to provide a cup having a standard diameter and height as discussed earlier.

D. Method of Determination of Incombustible Content

Specifically, the process includes irradiating a sample of the material with gamma rays. The source of the gamma rays is centered on the area of sensitivity of a detector in order to increase the amount of backscatter radiation that can be detected. The radiation is subsequently detected and measured. It was known that there was some relationship between the backscatter radiation and percentage incombustibles. The relationship, however, was one that did not easily lend itself to a direct conversion to incombustibles.

A significant discovery of this invention was the realization that it was not necessary to design an instrument to interpret the complex relationship to obtain the necessary information. It was discovered that the reciprocal of the count rate had a linear relation with the percentage incombustibles. This relation, shown in FIG. 4, illustrates the linear relationship of the reciprocal of the counts per minute, i.e., minutes per count versus percentage incombustibles in rock coal dust. It should be noted that this realization made the method and apparatus for determining percentage incombustibles significantly simpler and is an advancement in this art.

The curve of FIG. 4 shows the simplicity of the relationship. Mathematically this may be expressed as $$P(t) = at + b$$

where $P$ is the percent incombustibles, $t$ is the time to reach a fixed number of counts and a and b are constants. If the extremes of percents of coal and rock dust are measured to determine the constants a and b, $P(t)$ can be measured for any other sample.

The experiments have also shown that the reciprocal of the count rate is linearly related to the percentage of incombustible content and can be expressed differently. The reciprocal of the total counting rate can be shown as a combination.

$$1/N = P_c/N_c + b_{rd}/N_{rd}$$

where $N_c$ is the counting rate that would occur only if the coal were present, $N_{rd}$ is the counting rate that would occur if only rock dust were present, and $P_c$ and $P_{rd}$ are the percentage of the coal and rock dust respectively.

Since these quantities are linearly independent this discovery may apply to mixtures of substances other than coal and rock dust. Ordinarily, it would be expected that the separate counting rate would be independent of each other since the intensity of the backscatter should be proportional to the cross-section and the total counting rate should be proportional to constants depending upon a relative percentage times the separate count rate.

It should be noted that the linear independence of the components is probably dependent upon the exclusive reaction due to Compton scattering. If other effects take place, it would probably detract from the results disclosed herein. Thus, as long as there are no reactions among the two components used in the mixture there should be no reason why the relationship discovered would not apply to other mixtures in which Compton scattering is used to evaluate the percentage of the mixture.

It is possible to measure the count rate for a sample and then take the reciprocal of the count rate and plot the results. However, while this is simplified from the prior art it is more complex and time consuming than required. The reciprocal of the count rate is simply the time necessary to measure a given number of counts or minutes per count. Thus, the measurement of time for a given number of counts is equivalent to a measurement of the reciprocal of the count rate. In this manner, the time may be measured or there can be a direct calculation of the percentage incombustibles. Thus, the last step in practicing the method is a measurement of the reciprocal of the count rate or in a more simplified manner the time necessary for a given number of counts.

In practice, it was found that approximately 20 seconds at 500 counts per second yielded a 1 percent statistical error. This is a high degree of accuracy and is satisfactory for most uses. However, there are other often inaccuracies within any given instrument that would not actually permit a 1 percent error. Thus a longer time may be necessary in order to collect more counts and thus further reduce the amount of error.

E. Error

There are three major sources of error, they are bulk density, moisture content and variations in the bulk density minimum with incombustible content. As disclosed by the Stewart et al patent, there is a point called the bulk density minimum at which the effect of density are negligible. This point has been found to be related to the separation distances among the source detector and sample. Variation of the detector sample distance in experiments showed that at separations less than the bulk density minimum the counting rate in the low density material was higher while at distances greater than the minimum the higher density material produced a higher counting rate. The experiments in this invention showed that the detector-sample separation of about 10–15 mm and in particular 14 mm produced a result where the density did not create any measurable difference.

It was also found in this invention that the source-detector distance had to be minimized in order to obtain a bulk density minimum. Variations in source sample distance then resulted in concurrent variations in the detector sample separation. A successful range of distances between the source and sample is about 2 to 7.5 mm. It was further determined that a bulk density minimum could only be achieved when the source was collimated. With a 3/16 inch lead collimator as shown in FIG. 5, the above-noted approximate 14 mm separation produced a bulk minimum density.

The second error producing consideration is the moisture content of the sample. The moisture content decreases the bulk density of the material and thus reduces the backscattering gamma ray intensity. At the same time, the increasing hydrogen content from the water creates a higher density of scattering centers, increasing the backscattered gamma ray intensity. At the bulk density minimum, the counting rate should increase with moisture and produce a relatively large error. However, the air introduced by the moisture content can be compensated over a limited range by using a source sample separation distance greater than the bulk density minimum.

This compromise in order to solve the problem requires a distance between the source and sample where the density and moisture errors introduce a minimum overall error. In practice, it is possible to do this for moisture contents up to about 5 percent. Significantly, above 5 percent the readings show a lower incombustible content then is actually present. Thus, after compensation, the moisture content error is in such a direction as to provide a margin of safety.

In the present invention it was found that the bulk density minimum using a source sample separation of 14 mm actually produced a relatively smaller error up to 5 percent moisture content. Thus, only slight corrections were required.

The third source of error is the variation of the bulk density minimum with different mixtures of coal and rock dust. That is the separation distance corresponding to the correct bulk density minimum for 65 percent incombustible content sample does not correspond with the bulk density minimum for a 50 percent or 80 percent incombustible content sample. The variation in the counting rate may amount to as much as 5 percent over this range. It was found that the counting rate varies about 5 percent for 50 percent incombustible content sample from that of a 65 percent sample. Higher percentages than 65 percent incombustibles were found to have less than 5 percent error. Thus, if mixtures having much less than about 60 percent incombustibles were used the distance between the source and sample would have to be varied to give the correct bulk density minimum. However, in the field, the percentage incombustibles is normally about 60 percent and therefore does not create a significant problem.

It should be understood that variations in the size of the source, material used as the radiation source, and distance between components could be tolerated without deviating from the essence of the invention.

I claim:

1. An apparatus for quantitatively determining the composition of a sample of a mixture having more than one substance comprising:
    a radiation detector means having an area of sensitivity;
    means for supporting a sample of the mixture spaced from the radiation detector means, the area of sensitivity facing the supporting means;
    means for emanating radiation from between the area of sensitivity and the sample, the means for emanating radiation appropriately directing radiation toward the sample so that the radiation, detector means senses primarily only backscatter radiation from the source; and
    means for counting the backscatter radiation operatively connected to the radiation detector means as a measure of one of the substances of the mixture, said means for counting including means for inverting the count rate as a measurement of the percentage of one of the substances of the composition.

2. The apparatus of claim 1 wherein the source means is substantially adjacent to but spaced from the area of sensitivity of the detector.

3. The apparatus of claim 2 wherein the source means is substantially centered on the area of sensitivity.

4. The apparatus of claim 3 wherein the source means is collimated by and sets in a recess in a lead holder in order to yield a bulk density minimum, said recess facing the sample which is rock coal dust.

5. The apparatus of claim 4 wherein the means for emanating radiation sits in the recess about 0.100 inches below the top of the lead holder.

6. The apparatus of claim 4 wherein the spacing of the source means, sample and detector means are arranged in order to reduce variations in the count rate due to density and humidity.

7. The apparatus of claim 6 wherein the distance between the source and sample is about 2 mm to 7.5 mm and the distance between the sample and area of sensitivity of the detector is about 10 mm to 15 mm.

8. A method of quantitatively determining the composition of a sample having more than one substance comprising:
irradiating the sample having an appropriate thickness to give accurate tests with radiation from a source spaced from the sample;
deflecting radiation with the sample;
detecting the deflected radiation in a given area with a radiation detector at a distance from the sample, the distances between the source, sample and detector being such that density and humidity in different samples do not cause a significant deviation in the amount of deflected radiation;
measuring the reciprocal of the count rate as a measurement of the percentage of one of the substances of the composition.

9. The method of claim 8 wherein the sample is rock coal dust and the measuring of the reciprocal of the count rate is done by measuring the time necessary to reach a predetermined radiation count.

10. The method of claim 9 wherein the detecting of the radiation is done from a position on the opposite side of the source from the sample.

11. The method of claim 10 wherein the sample is about 2 inches thick to reduce differences in the count rate due to sample thickness.

12. The method of claim 11 wherein the radiation of the sample is done from the source located in the center of the detection area in order that the deflected radiation has a small angle of reflection.

13. The method of claim 12 wherein the distance of the source to the sample is a range of about 2 mm to 7.5 mm and the distance from the sample to the detector is about 10 mm to 15 mm.

14. The method of claim 13 wherein the radiation is directed by collimator to the sample and not to the detector directly.

15. The process of determining the percentage of incombustibles in rock coal dust comprising:
radiating a sample of rock coal dust with gamma radiation from a radiation source spaced from the sample, the sample presenting a thickness of about 2 inches to the entering gamma rays in order to minimize any changes from thickness of the material;
deflecting the gamma radiation with the sample;
detecting the deflected gamma radiation entering the area centered about and behind the radiation source;
measuring the time for detecting of a predetermined number of radiation counts as a measurement of the percentage of incombustibles.

16. The method of claim 15 wherein the process of claim 8 is a Amercium 241 having a strength of about 170 microcuries.

* * * * *